United States Patent
Taylor et al.

(10) Patent No.: US 6,342,776 B1
(45) Date of Patent: Jan. 29, 2002

(54) ACOUSTIC CHARGER FOR ELECTRONIC DEVICES

(75) Inventors: Elizabeth B. Taylor; Holley McBroom, both of Atlanta; Grant H. Lloyd, Lawrenceville, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/764,251

(22) Filed: Jan. 17, 2001

(51) Int. Cl.[7] .................................................. H02J 7/00
(52) U.S. Cl. ....................... 320/137; 320/107; 320/123; 455/573
(58) Field of Search ................................ 320/107, 123, 320/137, 114; 455/426, 550, 573

(56) References Cited

U.S. PATENT DOCUMENTS

| | | | |
|---|---|---|---|
| 4,599,551 A | * 7/1986 | Yun | 349/58 |
| 4,820,952 A | 4/1989 | Lee | |
| 5,554,922 A | * 9/1996 | Kunkel | 322/3 |
| 5,659,173 A | * 8/1997 | Putterman | 250/361 C |
| 5,796,854 A | 8/1998 | Markow | |
| 5,838,138 A | 10/1998 | Henty | |
| 5,889,383 A | * 3/1999 | Teich | 320/107 |
| 5,926,237 A | 7/1999 | Yun | |
| D416,259 S | 10/1999 | Hoyt | |
| 6,023,147 A | 2/2000 | Cargin, Jr. et al. | |
| 6,044,159 A | 3/2000 | Schmertmann | |
| 6,151,401 A | 10/2000 | Annaratone | |

* cited by examiner

*Primary Examiner*—Gregory Toatley
(74) *Attorney, Agent, or Firm*—Philip H. Burrus, IV

(57) ABSTRACT

The present invention includes a means for charging the battery of an electronic device by converting acoustic energy to electrical current. In one preferred embodiment, the protective layer of a liquid crystal display screen has a magnetic material disposed thereon. The housing of the liquid crystal display includes a corresponding coil of wire. As the protective layer has freedom of motion given by the liquid crystal panel, when acoustic energy is incident upon the protective layer, the protective layer moves, causing the magnetic material to generate a changing magnetic field in the coil. In an alternate embodiment, the protective layer is connected to piezoelectric transducers. When acoustic energy is incident upon the protective layer, the piezoelectric transducers are actuated. In another embodiment, the electronic device comprises an input for receiving concentrated acoustic energy from various sources including loudspeakers and acoustic waveguides.

9 Claims, 4 Drawing Sheets

ACOUSTIC CHARGER FOR ELECTRONIC DEVICES

TECHNICAL FIELD

This invention relates generally to a means for trickle charging a battery in an electronic device, and more specifically to a means for acoustically charging a battery in a device having a liquid crystal display or other acoustic port.

BACKGROUND

Portable, or "laptop", computer systems are rapidly developing the capabilities of conventional desktop or floor mounted personal computer systems. Many peripherals are being integrated into laptops, including hard disks, floppy disks, backup drives, and modems. The displays in the portable computer systems are becoming much more elaborate and readable. The pixel count on the standard liquid crystal displays (LCD's) utilized is increasing, as is the viewing angle. The use of backlighting allows use of LCD's in low light environments and improves the contrast ratio of the display. More complex circuitry is being installed in the portable computers to support these improved peripheral devices and to support the increased speeds and capabilities of the microprocessors utilized in the portable computer systems.

The various peripheral devices and high-speed circuitry mentioned above consume large amounts of power when operating. This has made it very difficult to provide all the possible functionality, while maintaining an acceptable battery life, when the portable computer system is battery powered. CMOS components helped to reduce the power consumption, but even the use of CMOS technology is insufficient at the clock speeds and performance levels of available circuitry. Therefore, a dilemma exists between providing less functionality with longer battery life or greater functionality with less battery life.

Several alternatives are in use to resolve this problem. For example, the IBM PC Convertible included a switch which the user could press to place the computer system in a standby mode, but user action requirement limited its use to instances where the user remembered to depress the switch. Screen savers saved power and prolonged the life of the display. A hard disk unit was developed which reduced the power consumption by controlling electronics to turn off the read channel circuitry until servo bursts were expected. While these alternatives did provide some relief, they were not complete solutions to satisfactorily resolve the dilemma.

There have been attempts at alternative charging systems. For example, U.S. Pat. No. 5,838,138, issued to Henty, discloses a manual method of charging by depressing the keys on the keyboard and converting the mechanical energy into electrical energy. While this is a viable solution, it is cost prohibitive. On the standard computer keyboard, there are over 66 keys. A computer using this technology would thus require over 66 "mini-chargers". This can get expensive.

There is therefore a need for a novel means of providing charge current to a battery to increase battery life.

DETAILED DESCRIPTION OF THE INVENTION

Figure 1:
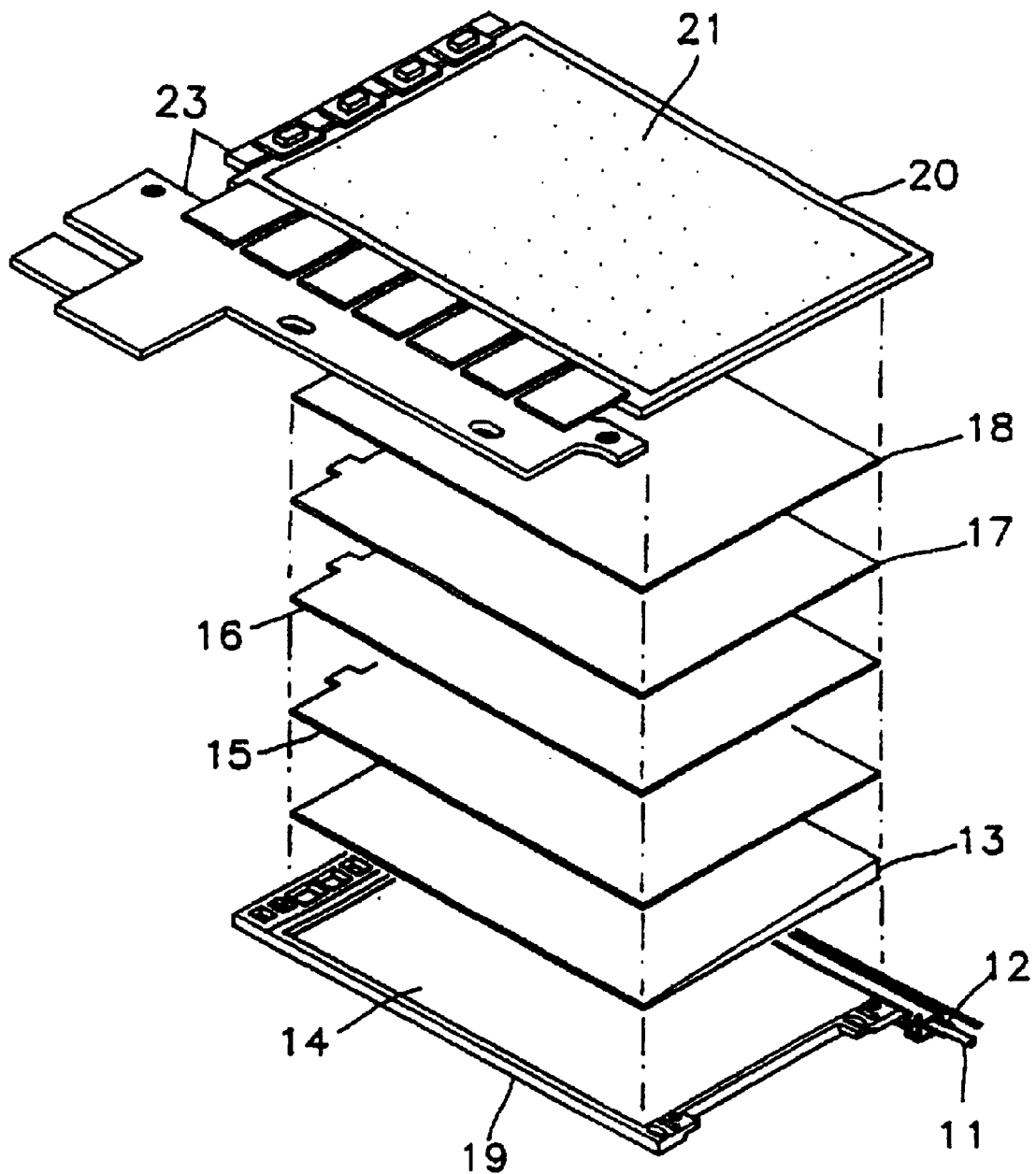
FIG. 1 illustrates a liquid crystal display in accordance with the prior art.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Most all laptop personal computers include a liquid crystal display (LCD). A LCD utilizes two sheets of polarizing material with a liquid crystal solution sandwiched between them. When an electric current is passed through the liquid, the crystals align such that light does not pass through them. In other words, each crystal acts a little like a shutter, as it either allows light to pass through or blocks it.

Referring now to FIG. 1, illustrated therein is a liquid crystal display (LCD) device used for such a computer. The LCD device includes a liquid crystal panel 20, an optional back light unit, and a driving circuit board 23. The back light unit is comprised of a luminescent lamp 11, a lamp housing 12 having a U-shape and surrounding the lamp 11, a light guide 13, a reflector 14 reflecting the incident light from the horizontal direction to the vertical direction, a protection sheet 15 contacting the light guide 13, a first prism sheet 16 and a second prism sheet 17 set on the protecting sheet (diffuser) 15 and condensing the incident light from the light guide 13 to some direction, a diffuser 18 diffusing the light from the first and second prisms 16 and 17 to a viewing area 21 of the liquid crystal panel 20 with a certain viewing angle, and a first support frame 19 supporting these elements.

In this LCD structure, the outermost layer, either the reflector 14 of the protecting sheet 15 is allowed to "float" on the liquid crystal assembly. If you were to touch the display, you would feel the outer layer depress. You would also see the imager directly about hour finger become distorted as the liquid crystal is actually being compressed.

Figure 2:
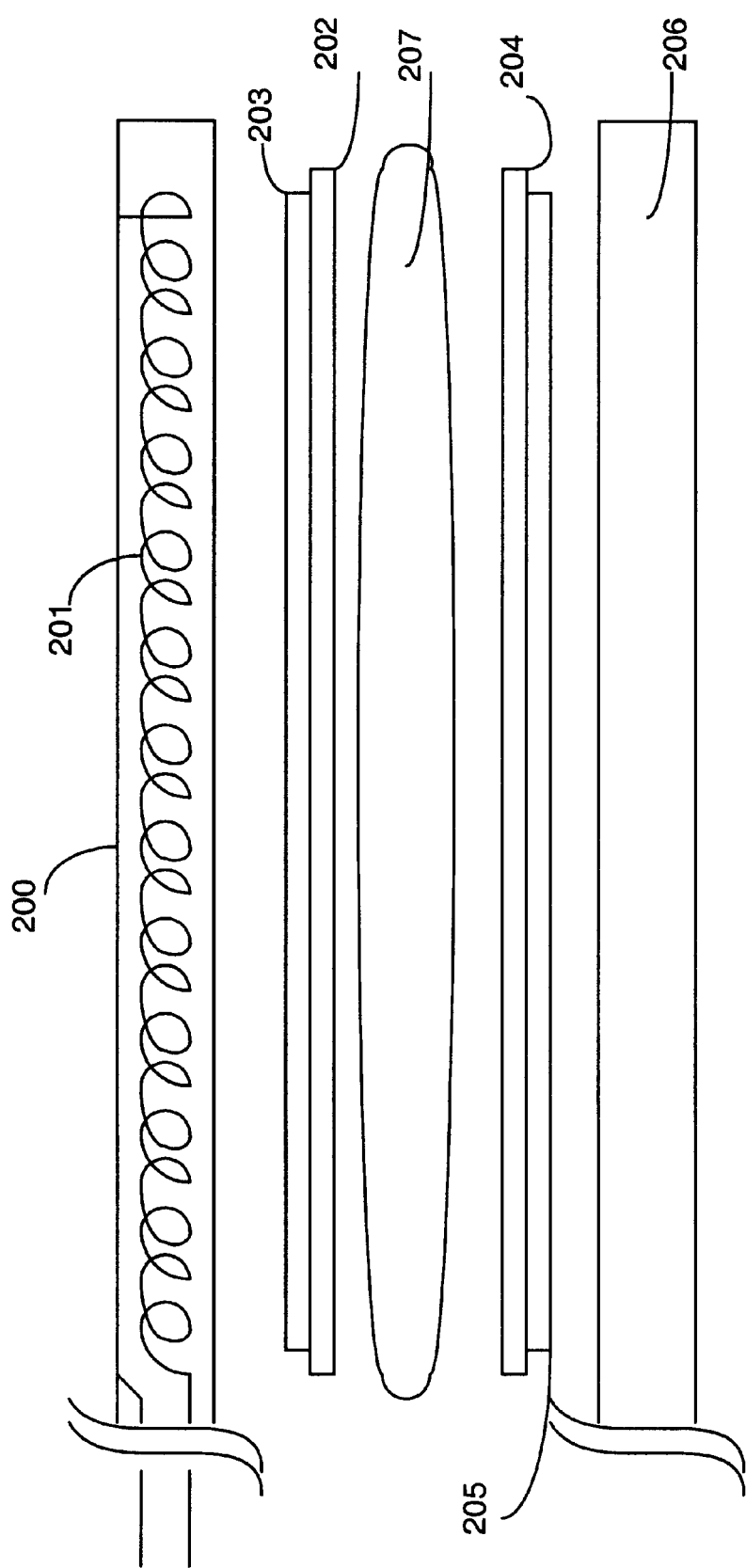
FIG. 2 illustrates one preferred embodiment of an acoustic charger in accordance with the invention.

The present invention seeks to exploit this freedom of motion and convert any motion caused by acoustic waves to be converted into a charging current. Referring now to FIG. 2, illustrated therein is one embodiment of an acoustic charger in accordance with the invention. Electrical circuitry necessary to drive the LCD as is known in the art is not shown for simplicity, but is included in the invention. The upper housing 200 and lower housing 206 are illustrated in a cross sectional view. The upper housing 200 has a window, while the lower housing 206 is solid. When the two are mated, they form the top of a laptop computer.

Sandwiched between the upper housing 200 and the lower housing 206 are the protective layer 202 and the back layer 204. The protective layer 202 is the plastic portion that the user sees and touches. The bottom layer 204 may be either reflective or not, and may include a backlight. A liquid crystal structure is disposed between the protective layer 202 and the bottom layer 204.

Magnetic material is disposed upon the protective layer 202 and the bottom layer 204. In this exemplary embodiment, a top magnetic layer 203 and a bottom magnetic layer 205 have been applied. A wire coil 201 is disposed within the top housing 200. The same could equally be disposed within the lower housing 206. When acoustic waves are incident upon the protective layer 202, they cause the protective layer 202 to move, which generates a changing magnetic field in the coil 201. The changing magnetic field causes a current to flow in the coil 201. This current may be coupled to the battery (not shown) to provide a trickle charge to the battery. Optional charging circuitry may be employed to modulate the voltage and current level. Additionally, capacitors may be included to store the trickle charge for immediate use.

Figure 3:
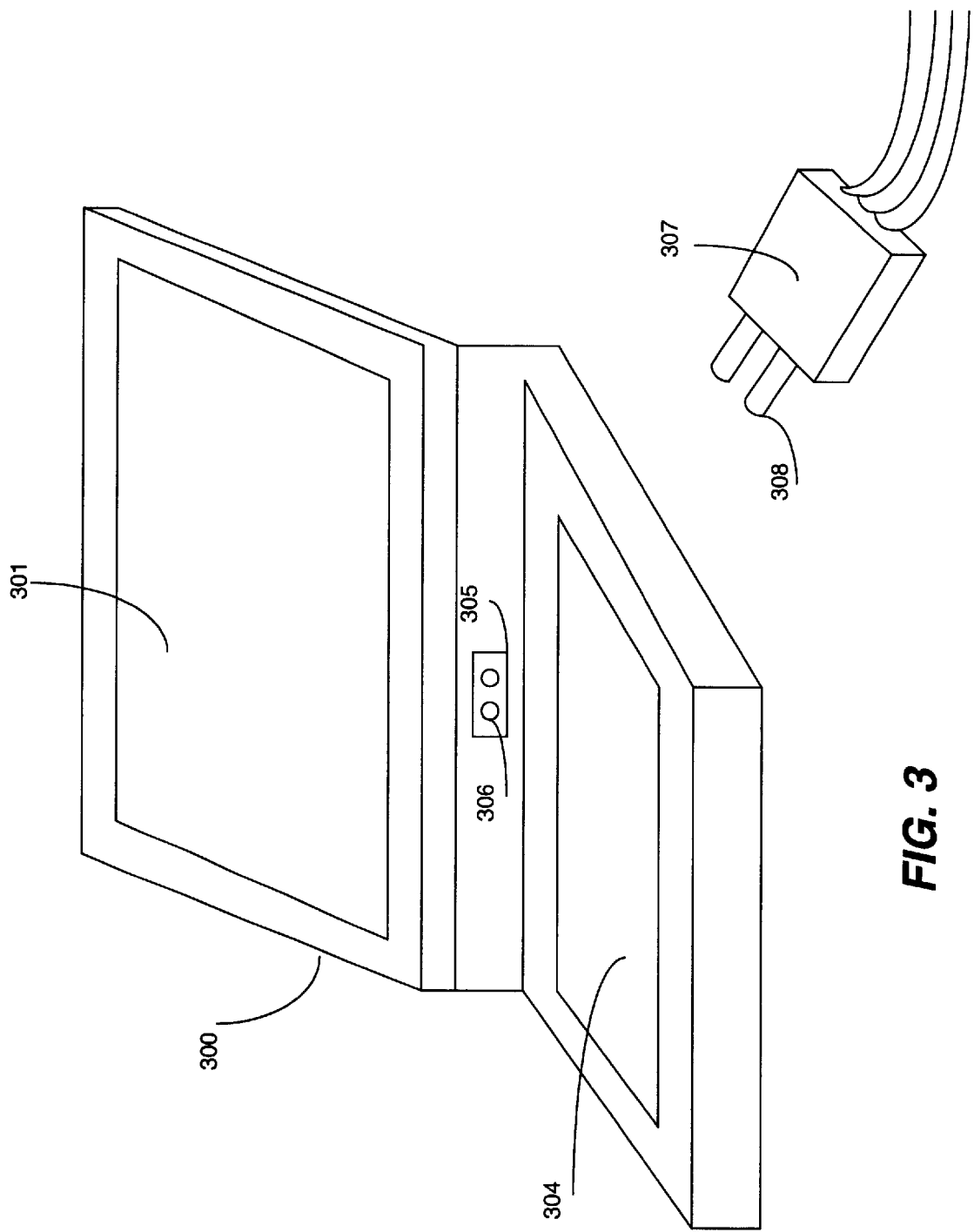
FIG. 3 illustrates an alternate embodiment of an acoustic charger in accordance with the invention.

Referring now to FIG. 3, illustrated therein is an alternate embodiment of the invention. There are times when ambient acoustic energy is low, but sources of concentrated acoustic energy are present. For example, when on a plane, the headphone sets that people use to watch movies and listen to music are nothing more that hollow tubes that convey acoustic energy from the outlet in the arm rest to the user's ear. FIG. 3 illustrates a laptop computer 300 having a screen 301 and a keyboard 304. The computer 300 has an input 305 for receiving an acoustic input from an airline headset 307. The headset connector 307 has two prongs 308, with each prong carrying a channel of acoustic energy. The prongs 308 couple to the mating holes 306 of the input. Once coupled, the computer can either direct the acoustic energy to the LCD screen through a wave guide for charging as described above, or it may couple directly to a speaker for charging as described in U.S. Pat. No. 5,889,383 issued Mar. 30, 1999 to Teich. It will be obvious to those skilled in the art that input devices can be designed to accommodate other acoustic inputs, including standard stereo headsets having speakers as opposed to acoustic wave guides.

Figure 4:
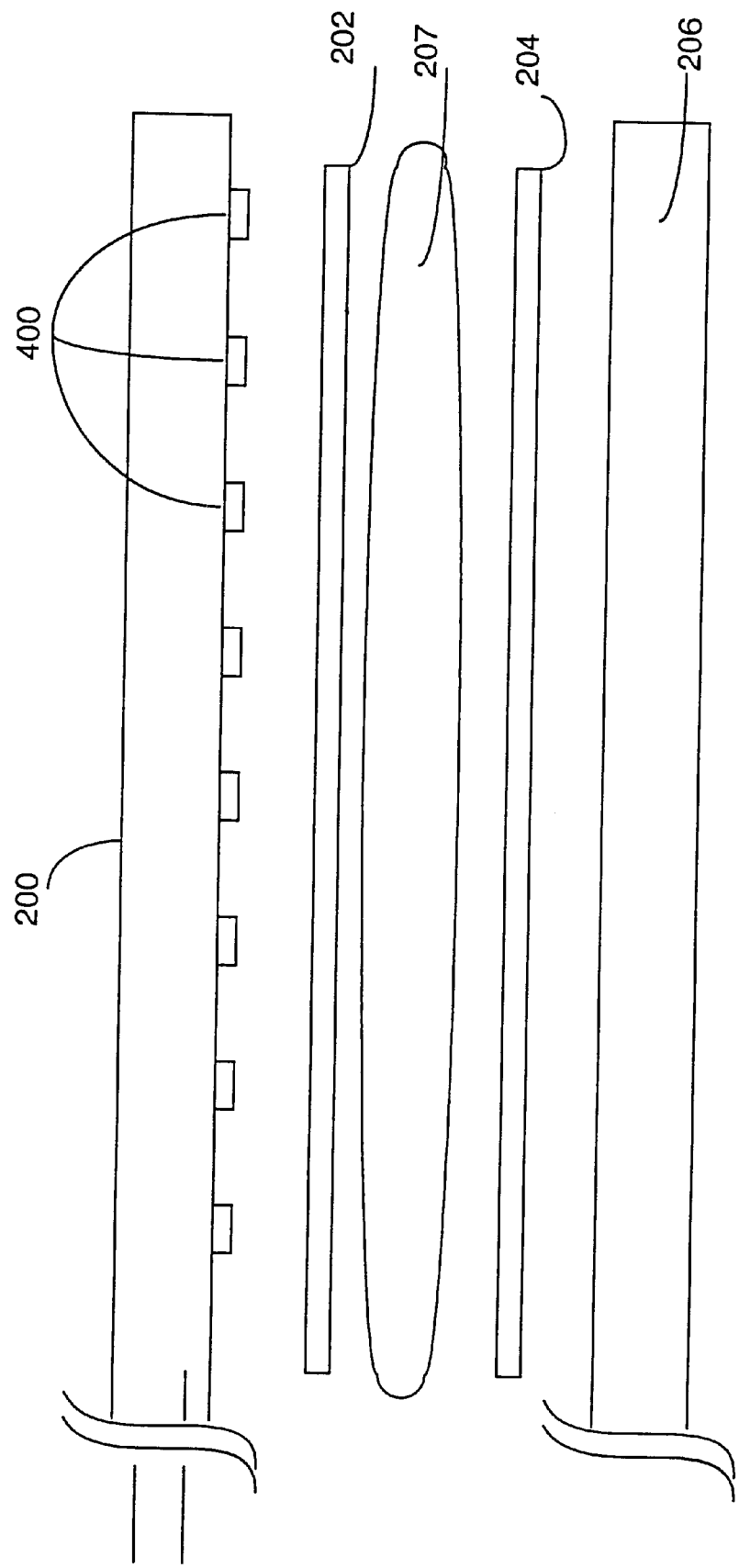
FIG. 4 illustrates an alternate embodiment of an acoustic charger in accordance with the invention.

An alternative embodiment of the LCD acoustic charger utilizes piezoelectric crystals. Referring to FIG. 4, illustrated therein is an alternate embodiment of the invention utilizing piezoelectric crystals. As in FIG. 2, the upper housing 200, lower housing, protective layer, liquid crystal layer and bottom layer are all shown. As opposed to having a coil and magnetic material however, the protective layer is disposed upon piezoelectric generators 400 once the layers are assembled together. When acoustic energy is incident upon the protective layer, the vibration causes the piezoelectric material in the generators 400 to be compressed, thereby generating electric current. Coupling this energy to a battery cell allows the battery to be charged. The piezoelectric generators 400 are known in the art, and any such may be used, including those described in U.S. Pat. No. 5,512,795, issued Apr. 30, 1996 to Epstein, et al., which is incorporated herein by reference.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment has been described as relating to a laptop computer, this invention could be easily expanded to include any electronic device having both a battery and a LCD display. This includes cellular telephones, pagers, personal data assistants, radios, televisions, and the like.

What is claimed is:

1. An acoustic battery charger comprising:

a. an electronic device having a liquid crystal display (LCD) and at least one rechargeable battery cell; and b. a means for converting acoustic energy incident upon the LCD to electrical current;

wherein the means for converting acoustic energy incident upon the LCD to electrical current is electrically coupled to the rechargeable battery cell.

2. The charger of claim 1, wherein the means for converting acoustic energy incident upon the LCD to electrical current comprises:

a. a protective layer;

b. a housing having a coil disposed within; and c. a magnetic layer disposed upon the protective layer;

wherein when acoustic energy is incident upon the protective layer, the magnetic layer causes a changing magnetic field about the coil.

3. The charger of claim 2, wherein the electronic device is selected from the group consisting of a portable computer, cellular telephone, radio, pager, personal data assistant and television.

4. The charger of claim 3, wherein the electronic device further comprises an input for receiving acoustic energy from a generating source.

5. The charger of claim 4, wherein the generating source is selected from the group consisting of acoustic wave guides and loudspeakers.

6. The charger of claim 1, wherein the means for converting acoustic energy incident upon the LCD to electrical current comprises:

a. a protective layer; and b. a housing having piezoelectric transducers disposed thereon;

wherein when acoustic energy is incident upon the protective layer, the piezoelectric transducers are actuated.

7. The charger of claim 6, wherein the electronic device is selected from the group consisting of a portable computer, cellular telephone, radio, pager, personal data assistant and television.

8. The charger of claim 7, wherein the electronic device further comprises an input for receiving acoustic energy from a generating source.

9. The charger of claim 8, wherein the generating source is selected from the group consisting of acoustic wave guides and loudspeakers.

* * * * *